Jan. 12, 1965 C. J. KLOSTERMAN 3,165,732

ANALOG-TO-DIGITAL CONVERTER

Filed Jan. 21, 1960

INVENTOR
CLARANCE J. KLOSTERMAN

BY [signature]

ATTORNEY 3,165,732

ANALOG-TO-DIGITAL CONVERTER

Clarence J. Klosterman, Tujunga, Calif., assignor to General Precision, Inc.

Filed Jan. 21, 1960, Ser. No. 3,844
7 Claims. (Cl. 340—347)

This invention relates to analog-to-digital converters and more particularly to a novel and improved means of electrical switching in accordance with the pattern on the face of an analog-to-digital converter binary coded disk.

Most of the analog-to-digital converters presently in use utilize a plurality of fine wire metallic brushes that make contact with alternate conducting and non-conducting segments on a binary coded disk. This technique has three important difficulties that impair the operation and shorten the useable life of the converter: with extended use, the brushes wear, crystallize and break; the fine resilient wire in the brushes vibrate and generate an electrical "noise" in the system; and the current carrying capacity of the brushes must be maintained at an absolute minimum in order to prevent brush arcing and corrosion on both the brushes and the conducting segment of the coded disk.

An object of this invention is to provide an analog-to-digital converter with extremely long wearing individually adjustable contacts.

Another object of this invention is to provide an analog-to-digital converter with a high signal to noise ratio.

A further object of this invention is to provide an analog-to-digital converter with contacts having a relatively high current carrying capacity.

Briefly described, one embodiment of this invention comprises a rotatable disk with raised and recessed segments in concentric rings on the face of the disk, said segments being arranged to form a binary digital code. A plurality of switches, each comprised of an adjustable screw contact and a resilient spring contact are positioned near the coded face of the disk and are separated from the disk by a retaining member containing pairs of spherical balls that actuate the resilient spring contacts in accordance with the coded raised or recessed pattern in the concentric rings on the face of the disk.

Other objects and advantages of this invention will become apparent in the following detailed description when taken in conjunction with the attached drawings in which.

Figure 1:
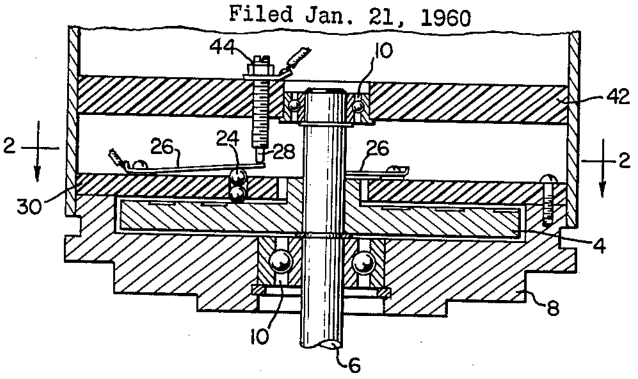
FIGURE 1 shows a side elevation view of a preferred embodiment of this invention.
Figure 2:
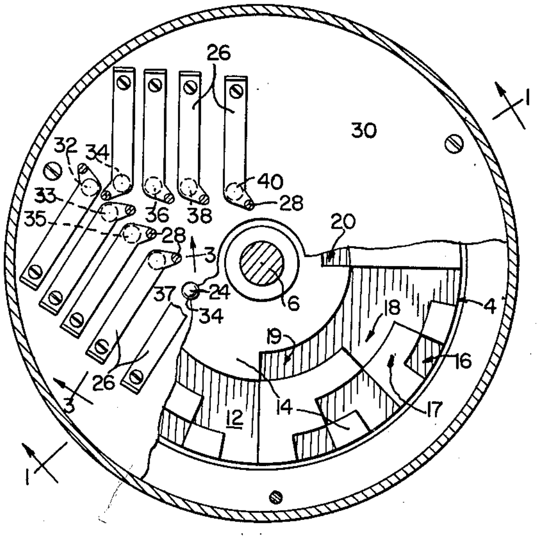
FIGURE 2 shows a sectional view taken on the line 2—2 of FIGURE 1 and shows the positioning of the switching elements and a portion of the binary digital coded pattern of the coded disk in its preferred embodiment.

Referring now to FIGURE 1, a coded disk 4 supported on shaft 6 is mounted in housing 8 by bearings 10 so that it may be rotated in either direction. The disk is preferably made of a tool steel that is hardened, ground flat and then etched with a code, such as the binary digital design shown in FIGURE 2. In FIGURE 2, the shaded segments 12 represent the etched or recessed portion of the disk and may be recessed 0.0035 inch below the raised or unshaded area 14. In the binary digital code, as shown in FIGURE 2, the raised and recessed segments are arranged in concentric rows 16, 17, 18, 19 and 20 which are "read" at any angular position of the disk to give a binary digital representation of that particular angular position. While a six bit binary coded disk is shown here, it is to be understood that this particular disk is illustrative only.

Figure 3:
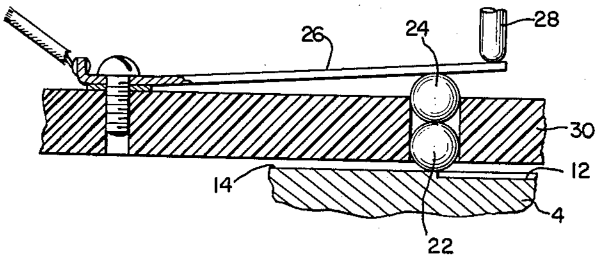
FIGURE 3 shows an elevation section taken along line 3—3 of FIGURE 2 and shows in detail the switching mechanism employed in the invention.

In this invention, the pattern on the disk 4 is "read" by the action of a pair of spherical balls 22 and 24 bearing against a resilient element 26 which makes electrical contact with adjustable screw contact 28 as shown in FIGURES 1 and 3.

The spherical balls 22 and 24 are loosely mounted in a supporting member 30 and are positioned so that they will ride in the concentric rows 16, 17, 18, 19 and 20 of disk 4. Attached to supporting member 30 is a plurality of resilient elements 26 each of which is positioned so that by its resiliency the balls 22 and 24 are forced against the face of disk 4. A screw contact support 42, shown in FIGURE 1, is located near the face of supporting member 30 on the side opposite disk 4 and contains a plurality of tapped holes in which screw contacts 28 are inserted and locked by set-screws 44 as shown. The contacting ends of screw contacts 28 and of resilient elements 26 may, if desired, be plated with silver, or the like to improve electrical conductivity and prevent corrosion at these points.

In order to prevent electrical conductivity between disk 4 and resilient contact 26, spherical balls 24 and supporting member 30 should be of a non-conductive material. While the spherical balls 22 may be of a hard steel and approximately $\frac{1}{16}$ inch in diameter, spherical ball 24 may be made of a non-conductive sapphire glass. Similarly, supporting element 30 may be made of non-conductive nylon or Teflon.

There are many cases where resilient contact 26 may be permitted to be at the potential of housing 8. In these cases, it is permissible for screw contact support 42 to be made of a conductive metallic material. However, in order to isolate the screw contacts 28 from each other, the screw contact support 42 should be made of a non-conductive material, such as nylon or Teflon.

When using a binary digital coded disk, such as that shown in FIGURE 2, the positioning of the balls 22 and 24 and switch contacts 26 and 28 of FIGURE 1 and FIGURE 3 may be arranged to form a non-ambiguous readout system such as the V-scan shown in FIGURE 2. A system of this type is generally necessary to avoid reading errors occurring at the borders of the code in a particular track. A non-ambiguous readout may be provided in this invention by positioning balls 22 and 24 over points 32, 33, 34, 35, 36, 37, 38, 39 and 40 in rows 16, 17, 18, 19 and 20 of disk 4, respectively, as shown in FIGURE 2. External circuitry (not shown) will, for example, select which of points 33 or 34 in row 17 will be "read" depending on whether point 32 in row 16 is on a raised or recessed segment. Similarly, the external circuitry will select which points 35 or 36 in row 18 will be "read" depending on whether the point that was "read" in row 17 is on a raised or recessed segment. In this manner, any point that is selected to be "read" is well within any particular raised or recessed segment and is, therefore, not subjected to possible error caused by reading at the borders between segments in a particular concentric row.

The numbers of pairs of spherical balls and associated resilient and screw contacts will depend upon the code that is used on disk 4. In the embodiment shown in FIGURE 2, it can be seen that nine pairs of balls and associated contacts will be required to provide a non-ambiguous readout for a disk containing five concentric rows of coded segments. In this five row disk, thirty-two separate binary numbers are produced in one complete revolution of disk 4. Additional concentric rows may be added to increase the count per revolution in accordance with the equation: total count$=2^n$, where $n$ is the number of rows on the disk (i.e., six rows will produce 64 counts per revolution, seven rows produce 128 counts per revolution, etc.). Each additional row requires two sets of switch contacts and ball pairs.

In operation a rotation proportional to a mechanical analog quantity is applied to the shaft 6 of the converter causing the disk 4 to rotate in the direction, and by an angle, dictated by the applied analog quantity. The raised segments in each concentric row on disk 4 will force spherical balls 22 and 24 to actuate the resilient contacts 26 against adjustable screw contacts 28 causing an electrical conductivity through the contacts that is supplied to successive electronic devices which are not shown and form no part of this invention.

It is to be understood that the foregoing disclosure relates only to one embodiment of the invention and that modifications and alterations may be made in design and materials without departing from the spirit and scope of the invention.

I claim:

1. An analog-to-digital converter comprising a rotatable shaft, a disk axially attached to said rotatable shaft, a plurality of concentric rows of raised and recessed segments arranged on the face of said disk to provide a digitally coded pattern, a supporting member adjacent the coded face of said disk, a plurality of switches attached to said supporting member, and electrically non-conducting spherical balls positioned between said switches and said disk adapted to actuate said switches in accordance with the coded pattern on said disk.

2. An analog-to-digital converter comprising a rotatable disk, a plurality of concentric rows of raised and recessed segments arranged on the face of said disk in the form of a digitally coded pattern, means to rotate said disk in either direction on a central axis perpendicular to its faces, a plurality of switches positioned in spaced relation to said disk, and on actuating element comprising one or more spherical balls positioned between said disk and each of said plurality of switches to actuate said switches in accordance with the coded pattern on said disk, at least one ball in each actuating element being electrically non-conducting.

3. A shaft rotation to digital encoder comprising a rotatable disk, a plurality of concentric rows on one face of said disk, each of said rows having a plurality of raised and recessed segments arranged in a binary digital coded pattern, means to rotate said disk in either direction on an axis perpendicular to and in the center of said disk, a retaining member positioned adjacent the coded face of said disk, a resilient electrical contact member positioned adjacent said retaining member, a stationary electrical contact member positioned adjacent said resilient electrical contact member and arranged to form an electrical switch that closes when said resilient member is actuated by motion in a direction away from said retaining member and said coded disk, and actuating means located in said retaining member between said resilient electrical contact member and one concentric row of raised and recessed segments on said coded disk and electrically insulating said contact member from said coded disk, said actuating means being arranged to actuate said resilient electrical contact member in accordance with the coded pattern in that particular concentric row on said rotatable disk.

4. A shaft rotation to digital encoder as set forth in claim 3 in which said actuating means is comprised of one or more spherical balls.

5. An analog-to-digital converter comprising a rotatable coded disk, a plurality of concentric rows on one face of said disk, each of said concentric rows comprised of raised and recessed segments with angular length substantially twice the angular length of the segments in the adjacent outer row, means to rotate said coded disk in either direction on an axis perpendicular to and in the center of the faces of said coded disk, a retaining member positioned adjacent the coded face of said disk, a plurality of resilient electrical contact members mounted on said retaining member, a plurality of adjustable electrical contacts positioned adjacent said resilient contact members and arranged to form electrical switches that close when any one of said resilient contact members is acted upon by a force in a direction away from said coded disk, and an actuating element comprising a plurality of spherical balls loosely mounted in said retaining member between each of said resilient electrical contact members and said coded disk, said actuating element being arranged to actuate said resilient electrical contact members in accordance with the pattern of raised and recessed segments in the concentric rows on the coded face of said disk, at least one ball in each plurality being composed of electrically non-conducting material.

6. An analog-to-digital converter comprising a coded disk, a plurality of concentric rows on one face of said disk, each of said rows having a plurality of raised and recessed segments arranged in a coded pattern, a retaining member positioned adjacent the coded face of said disk, means to produce relative rotation between said disk and said retaining member, a resilient electrical contact member positioned adjacent said retaining member, a stationary electrical contact member positioned adjacent said resilient electrical contact member and arranged to form an electrical switch that closes when said resilient member is actuated by motion in a direction away from said retaining member and said coded disk, and actuating means located in said retaining member between said resilient contact member and one concentric row of raised and recessed segments on said coded disk and electrically insulating said contact member from said coded disk, said actuating means arranged to actuate said resilient electrical member in accordance with the coded pattern in that particular concentric row on said coded disk.

7. An analog-to-digital converter comprising a housing, a shaft rotatably mounted in said housing, a disk axially mounted to said shaft, a plurality of concentric rows on one face of said disk, each of said concentric rows having a plurality of raised and recessed segments that form a coded pattern, a retaining member positioned adjacent the coded face of said disk and rigidly mounted to said housing, a support member positioned in spaced relationship and substantially parallel to said retaining member and rigidly mounted to said housing, a plurality of resilient electrical contact members mounted on said retaining member, a plurality of adjustable electrical contact members mounted on said support member and positioned adjacent said resilient contact member to form electrical switches that close when any one of said resilient contact members is acted upon by a force in a direction away from said coded disk, and an actuating element comprising a plurality of spherical balls loosely mounted in said retaining member between each of said resilient electrical contact members and said coded disk, said actuating element being arranged to actuate said resilient electrical contact members in accordance with the pattern of raised and recessed segments in the concentric rows on the coded face of said disk when said disk and said housing are rotated with respect to each other, at least one ball in each said plurality being composed of electrically non-conducting material.

References Cited in the file of this patent

UNITED STATES PATENTS

| | | |
|---|---|---|
| 1,832,869 | Macy | Nov. 24, 1931 |
| 2,813,677 | Scarbrough | Nov. 19, 1957 |
| 2,958,860 | Petherick | Nov. 1, 1960 |
| 2,989,680 | Weiser et al. | June 20, 1961 |